(12) United States Patent
Sherlock

(10) Patent No.: US 11,263,831 B2
(45) Date of Patent: *Mar. 1, 2022

(54) UTILIZING ON-BOARD MEASUREMENTS AND LOCATION AS INPUTS INTO LOAD TRACKING

(71) Applicant: Deere & Company, Moline, IL (US)

(72) Inventor: Lance R. Sherlock, Dubuque, IA (US)

(73) Assignee: Deere & Company, Moline, IL (US)

(*) Notice: Subject to any disclaimer, the term of this patent is extended or adjusted under 35 U.S.C. 154(b) by 16 days.

This patent is subject to a terminal disclaimer.

(21) Appl. No.: 16/457,185

(22) Filed: Jun. 28, 2019

(65) Prior Publication Data

US 2019/0318551 A1 Oct. 17, 2019

Related U.S. Application Data

(63) Continuation of application No. 15/701,688, filed on Sep. 12, 2017.

(51) Int. Cl.
*G07C 5/00* (2006.01)
*E02F 9/20* (2006.01)
*E02F 5/02* (2006.01)
*G06Q 10/06* (2012.01)

(52) U.S. Cl.
CPC .......... *G07C 5/008* (2013.01); *E02F 5/02* (2013.01); *E02F 9/2054* (2013.01); *G06Q 10/06312* (2013.01); *G06Q 10/06313* (2013.01)

(58) Field of Classification Search
CPC ......... G07C 5/008; G07C 5/02; E02F 9/2054; E02F 5/02; E02F 9/26; E02F 9/261; G06Q 10/06313; G06Q 10/06312
See application file for complete search history.

(56) References Cited

U.S. PATENT DOCUMENTS

| | | | | |
|---|---|---|---|---|
| 4,230,196 A | * | 10/1980 | Snead ................... | E02F 3/3411 177/141 |
| 4,831,539 A | * | 5/1989 | Hagenbuch ............ | G07C 5/085 701/33.4 |
| 4,919,222 A | * | 4/1990 | Kyrtsos ................. | G01G 5/04 177/139 |
| 5,065,326 A | * | 11/1991 | Sahm ..................... | E02F 3/438 701/50 |

(Continued)

*Primary Examiner* — Mussa A Shaawat
(74) *Attorney, Agent, or Firm* — Joseph R. Kelly; Kelly, Holt & Christenson PLLC

(57) ABSTRACT

A mobile machine includes a load carrying mechanism configured to carry a load of material during operation of the mobile machine at a worksite. The mobile machine includes a position detection system configured to determine a position of the mobile machine and generate a position output indicative of the position of the mobile machine. The mobile machine includes a measuring system configured to determine a measure of the load and generate a measure output indicative of the measure of the load. The mobile machine also includes a material movement tracking system configured to receive the position output from the position detection system and the measure output from the measuring system and, based on both the position and the measure output, generate a material tracking indicator indicative of movement of the load of material around the worksite.

20 Claims, 5 Drawing Sheets

(56) References Cited

U.S. PATENT DOCUMENTS

| | | | | |
|---|---|---|---|---|
| 5,082,071 A * | 1/1992 | Kyrtsos | ............... | G01G 19/083 177/25.14 |
| 5,105,896 A * | 4/1992 | Kyrtsos | ................... | E02F 9/264 177/139 |
| 5,321,637 A * | 6/1994 | Anderson | ............... | E02F 9/264 702/174 |
| 5,784,945 A | 7/1998 | Krone et al. | | |
| 5,826,666 A | 10/1998 | Tozawa et al. | | |
| 7,894,961 B2 | 2/2011 | Blackburn et al. | | |
| 8,515,627 B2 * | 8/2013 | Marathe | ................. | E02F 3/431 701/50 |
| 8,838,331 B2 * | 9/2014 | Jensen | .................... | G01N 9/36 701/34.4 |
| 9,685,009 B2 * | 6/2017 | Sprock | ............... | G06Q 10/0639 |
| 10,234,368 B2 * | 3/2019 | Cherney | .................. | G01N 9/02 |
| 10,380,808 B2 | 8/2019 | Sherlock | | |
| 2006/0243056 A1 * | 11/2006 | Sundermeyer | ........... | G01N 3/32 73/760 |
| 2006/0243180 A1 * | 11/2006 | Sundermeyer | ......... | A01B 63/00 112/470.06 |
| 2009/0062993 A1 * | 3/2009 | Morey | .................. | E02F 3/6436 701/50 |
| 2011/0301817 A1 * | 12/2011 | Hobenshield | ............. | E02F 9/26 701/50 |
| 2012/0136525 A1 | 5/2012 | Everett et al. | | |
| 2012/0136542 A1 * | 5/2012 | Upcroft | .................... | E02F 3/48 701/50 |
| 2012/0215378 A1 | 8/2012 | Sprock et al. | | |
| 2013/0054133 A1 * | 2/2013 | Lewis | ............... | G01C 21/3407 701/423 |
| 2014/0371899 A1 | 12/2014 | Nagaoka | | |
| 2016/0299116 A1 | 10/2016 | Talmaki et al. | | |
| 2017/0278315 A1 * | 9/2017 | Christofferson | ..... | G07C 5/0825 |
| 2018/0216315 A1 * | 8/2018 | Benson | ................. | E02F 9/2029 |
| 2020/0134955 A1 * | 4/2020 | Kishita | ................... | G06F 21/35 |

* cited by examiner

UTILIZING ON-BOARD MEASUREMENTS AND LOCATION AS INPUTS INTO LOAD TRACKING

FIELD OF THE DESCRIPTION

The present description relates to material movement tracking. More specifically, the present description relates to generating material tracking indicators based on a position of a mobile machine and a measure of a load of material on the mobile machine.

BACKGROUND

There are many different types of mobile machines. Some such mobile machines include agricultural machines, construction machines, forestry machines, turf management machines, among others. Many of these pieces of mobile equipment have mechanisms that are controlled by the operator in performing operations. For instance, a construction machine can have multiple different mechanical, electrical, hydraulic, pneumatic and electro-mechanical subsystems, among others, all of which can be operated by the operator.

Construction machines are often tasked with transporting material across a worksite, or into or out of a worksite, in accordance with a worksite operation. Different worksite operations may include moving material from one location to another or leveling a worksite, etc. During a worksite operation, a variety of construction machines may be used, including articulated dump trucks, wheel loaders and excavators, among others. Worksite operations may involve a large number of steps or phases and may be quite complex.

The discussion above is merely provided for general background information and is not intended to be used as an aid in determining the scope of the claimed subject matter.

SUMMARY

A mobile machine includes a load carrying mechanism configured to carry a load of material during operation of the mobile machine at a worksite. The mobile machine includes a position detection system configured to determine a position of the mobile machine and generate a position output indicative of the position of the mobile machine. The mobile machine includes a measuring system configured to determine a measure of the load and generate a measure output indicative of the measure of the load. The mobile machine also includes a material movement tracking system configured to receive the position output from the position detection system and the measure output from the measuring system and, based on both the position and the measure output, generate a material tracking indicator indicative of movement of the load of material around the worksite.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

In carrying out a worksite operation, it may be desired to track an amount of material moved and machine movement in order to estimate how much of the worksite operation is completed. Further, billing may depend on how much material is moved over a specific time period. Additionally, it may be desired to accurately monitor both an amount of material moved and machine movement during a worksite operation in order to ensure that the worksite operation is completed on time.

In order to accurately monitor mobile machine movement throughout a worksite and an amount of material moved, a material movement tracking system on a mobile machine generates material tracking indicators based on a position of a mobile machine and a measure of a load of material on the mobile machine. In one example, the generated material tracking indicators allow a manager of a worksite to accurately track an amount of material moved throughout a worksite operation. This may include recognizing dump and dig cycles, material leaving or being added to a worksite, and a location and movement of material from stockpiles on a worksite, among many other things.

Figure 1:
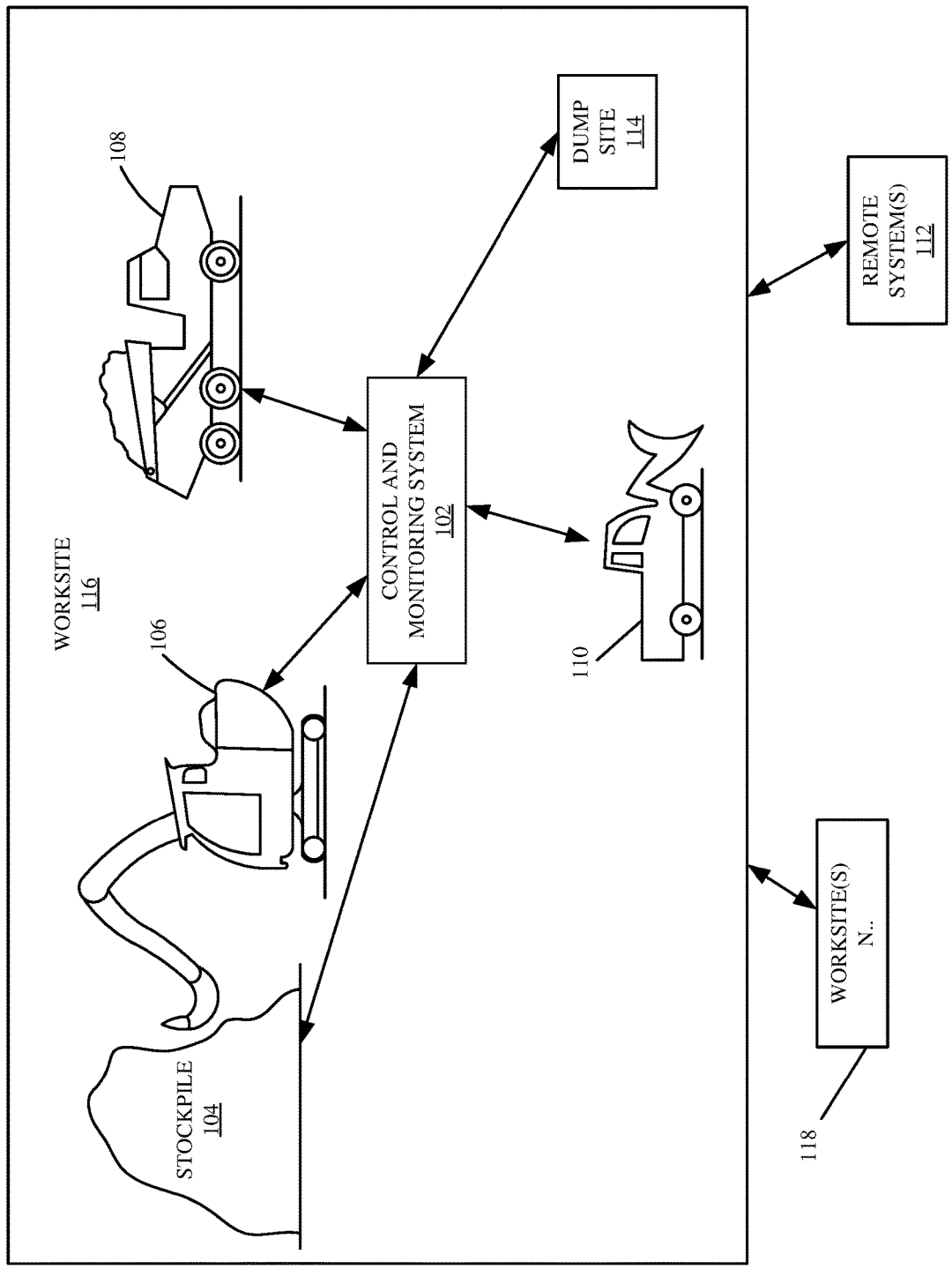
FIG. 1 is a diagram of one example of a worksite architecture.

FIG. 1 is a diagram of one example of a worksite architecture. Worksite architecture 100 illustratively includes a worksite 116 with a plurality of mobile machines 106, 108 and 110, a control and monitoring system 102, a pile of material 104, a dump site 114 and a remote system 112. While mobile machines 106, 108 and 110 illustratively include an excavator, an articulated dump truck and a wheel loader, respectively, it is to be understood that any combination of mobile machines may be used in accordance with the present description. In one example of a worksite operation, mobile machines 106, 108 and 110 move material from stockpile 104 to dump site 114 within worksite 116. This includes mobile machine 106 gathering material from stockpile 104 and dumping the material into mobile machine 108 for transport to dump site 114. Alternatively, mobile machine 110 can move material directly from stockpile 104 to dump site 114.

It will be noted that, in one example, each of machines 106-110, or a subset of the machines, may have their own control and monitoring system 102 which can communicate with one or more remote systems 112. Additionally, parts of system 102 can be disposed on each machine 106-110 and parts can be on a central system 102. For purposes of the present discussion, it will be assumed that system 102 is a central system that communicates with each machine 106-110, but this is just one example.

During a worksite operation, control and monitoring system 102 monitors a movement of mobile machines 106, 108 and 110 around worksite 116 and an amount of material moved. This is discussed in more detail later. Briefly, however, this includes receiving material tracking indicators from mobile machines 106, 108 and 110. Mobile machines 106, 108 and 110 include a communication system that communicates with control and monitoring system 102. In one example, mobile machines 106, 108 and 110 communicate through a wireless communication link over a network (such as the Internet or other network or combination of networks). It can include a cellular communication system, a messaging system, or a wide variety of other communication components, some of which are described in more detail below. Additionally, in some examples, personnel located at stockpile 104 and dump site 114 are also in communication with control and monitoring system 102. Further, as illustratively shown, in some examples, worksite architecture 100 can include a plurality of worksites 118 with mobile machines able to communicate with control and monitoring system 102. Additionally, while FIG. 1 shows that mobile machines 106, 108 and 110 and control and monitoring system 102 are able to connect with a single remote system 112, remote systems 112 can include a wide variety of different remote systems (or a plurality of remote systems) including a remote computing system accessible by mobile machines 106, 108 and 110 and control and monitoring system 102.

Figure 2:
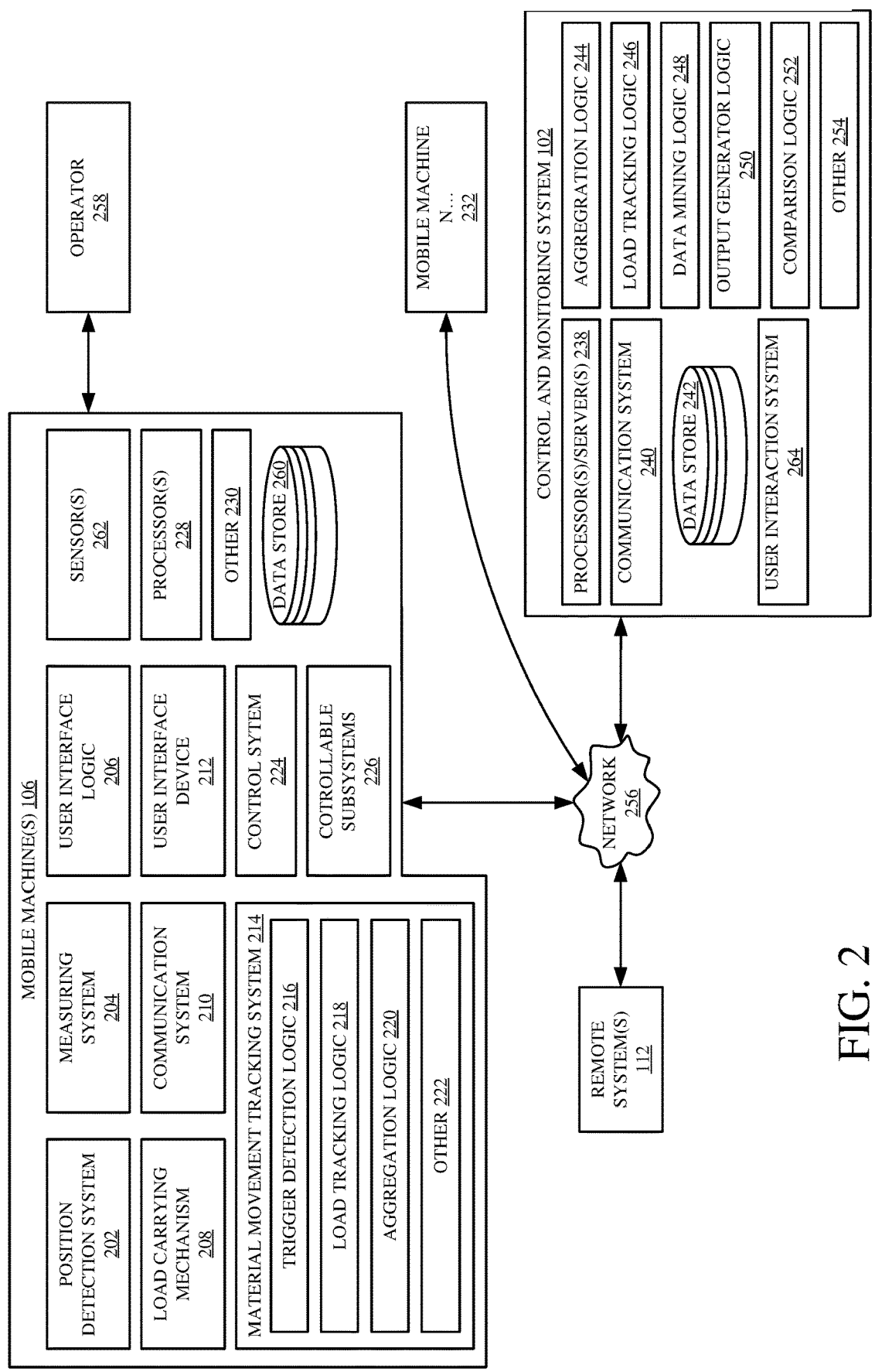
FIG. 2 is a block diagram of a mobile machine and a control and monitoring system of a worksite.

FIG. 2 is a block diagram of mobile machine 106 communicatively coupled to a control and monitoring system 102 over a network 256. While mobile machine 106 is illustratively shown in FIG. 2, it is to be understood that mobile machine 106 could be any or all mobile machines 106, 108, 110, 232, etc. Network 256 can be any of a wide variety of different types of networks, such as a wide area network, a local area network, a near field communication network, a cellular network, or any of a wide variety of other networks of combinations of networks. Mobile machine 106 illustratively includes a communication system 210, a control system 224, controllable subsystems 226, user interface logic 206, a user interface device 212, one or more processors 228, one or more sensors 262, data store 260, position detection system 202, measuring system 204, load carrying mechanism 208, material movement tracking system 214, and a wide variety of other items 230. In one example, material movement tracking system 214 includes trigger detection logic 216, load tracking logic 218, aggregation logic 220 and a variety of other logic 222. Before describing the operation of mobile machine 106 in more detail, a brief description of some of the items in mobile machine 106, and their operation, will first be provided.

Control system 224 can generate control signals for controlling a variety of different controllable subsystems 226 based on sensor signals generated by sensors 262, based on feedback received from remote system 112 or a control and monitoring system 102, based on operator inputs received through operator interface device 212, or it can generate control signals a wide variety of other ways as well. Controllable subsystems 226 can include a wide variety of mechanical, electrical, hydraulic, pneumatic, computer implemented and other systems of mobile machine 106 that relate to the movement of the machine, the operation that is performed, and other controllable features. Communication system 210 can include one or more communication systems that allow mobile machine 106 to communicate with remote system 112, control and monitoring system 102 and/or mobile machine 232 over network 256. User interface device 212 can include display devices, mechanical or electrical devices, audio devices, haptic devices, and a variety of other devices. In one example, user interface logic 206 generates an operator display on user interface device 212 which can include a display device that is integrated into an operator compartment of mobile machine 106, or it can be a separate display on a separate device that can be carried by operator 258 (such as a laptop computer, a mobile device, etc.).

Material movement tracking system 214 can generate material tracking indicators based on inputs from position detection system 202 and measuring system 204. Position detection system 202 can be one or more of a global positioning system (GPS) receiver, a LORAN system, a dead reckoning system, a cellular triangulation system, or other positioning system. In one example, position detection system 202 is configured to associate signals obtained by sensors 262 with a geospatial location, such as a location within a worksite. Additionally, in one example, based on a position of a GPS receiver on mobile machine 106, a location of a load of material can also be determined using known spatial relationships between a load carrying mechanism 208 of mobile machine 106 and the location of the GPS receiver on mobile machine 106. As such, when mobile machine 106 moves around a worksite, a position of mobile machine 106 can be determined or a position of a load of material on mobile machine 106 can be determined, or both. In some examples, a position of mobile machine 106 can be determined intermittently, however, it is also expressly contemplated that a position of mobile machine 106 can be determined continuously and/or whenever mobile machine 106 moves to a new location within a worksite.

Measuring system 204 is configured to determine a measure of a load of material located in load carrying mechanism 208 of mobile machine 106. In one example, a measure can include a weight, pressure, force, volume, heaviness or mass of material located within load carrying mechanism 208 of mobile machine 106, among other things. In one example, a measure can provide an indication of a type of material in load carrying mechanism 208 as a material being transported can vary in measure depending on the compounds that make up the material.

As an example, the present disclosure will now assume mobile machine 106 includes an articulated dump truck, even though it is to be understood that a variety of mobile machines can be used. In this example, load carrying mechanism 208 is a bin selectively moveable between a loading position and a tipping position through an extension of lift cylinders on articulated dump truck 106, and sensors 262 include weight sensors which can include strain gauges, or other sensors that sense the weight of the material in the bin. Upon receiving material in load carrying mechanism 208, measuring system 204 can determine a measure of the material, which can include a weight, using signals provided from the strain gauges.

Additionally, while load carrying mechanism 208 can be a bin, it is expressly contemplated that load carrying mechanism 208 can be a variety of containers or receptacles in accordance with the present description. Further, load carrying mechanism 208 can also include a digging mechanism that executes dig and dump operations, e.g. in the example in which mobile machine 106 is a wheel loader or excavator. The mobile machine 106 can include an excavator with a hydraulically-powered cylinder or cylinders that move the digging mechanisms. In this example, measuring system 204 can measure a pressure differential across the cylinder (s) and a position of extension of the cylinder(s), to determine a measure and position of a load of material. Alternatively, in other examples, measuring system 204 can receive signals from sensors 262 which include optical sensors, ultrasonic sensors, scales, etc. to determine a measure of a load of material.

The measure can then be provided to material movement tracking system 214 along with an indication of position. These items can be used to calculate a material movement tracking indicator that tracks movement of material around the worksite.

Upon receiving an indication of position and measure from position detection system 202 and measuring system 204, respectively, material movement tracking system 214 is configured to generate the material tracking indicator. In one example, the material tracking indicator indicates an amount of material, within a load carrying mechanism 208, at a position within a worksite. It can also identify the type of material. Material tracking indicators can be stored within data store 260 and/or communicated to remote system 112 and/or control and monitoring system 102. Material movement tracking system 214 also illustratively can include trigger detection logic 216, load tracking logic 218, aggregation logic 220 and a variety of other logic 222, which will now be described in more detail.

Trigger detection logic 216 can detect a presence of a load of material on mobile machine 106, and, in response to detecting a presence of a load, can provide an indication of the detected load to position detection system 202, measuring system 204 and/or material movement tracking system 214. In one example, trigger detection logic 216 can detect a trigger by detecting a change in measure as indicated by measuring system 204. For example, when no material is present on load carrying mechanism 208, an output of measuring system 204 can represent "zero" or "no load", and, upon receiving material, the output of measuring system 204 will increase suddenly. Thus, the sudden increase can act as a trigger to indicate that a load is now present in the load carrying mechanism 208 (e.g. the bin). This allows trigger detection logic 216 to detect things such as dig and dump operations in a worksite. The trigger can be provided to load tracking logic 218.

Load tracking logic 218 is configured to track movement of a load of material as mobile machine 106 moves throughout a worksite. For example, as a load of material is transported from a stockpile to a dump site, load tracking logic 218 can track a path of mobile machine 106 to identify the movement of the load of material around the worksite. Further, load tracking logic 218 can provide an indication that a load of material is leaving a worksite or entering a worksite. The indication can be provided to control and monitoring system 102 or remote system 112, for example.

Aggregation logic 244 is configured to aggregate a measure of multiple different loads of material moved by mobile machine 106, based on measure and position outputs, and generate an aggregate material tracking indicator indicative of movement of the aggregate measure of the material. The aggregate material tracking indicator can be generated intermittently or continuously throughout a worksite operation. For example, during a worksite operation, mobile machine 106 may move different loads throughout a worksite. Aggregation logic 220 can aggregate the measure and position outputs and generate an aggregate material tracking indicator that indicates how much material was moved by mobile machine 106, and where it was moved over a time period (such as a shift).

Outputs from material movement tracking system 214 on mobile machine 106 can be provided to remote system 112 and/or control and monitoring system 102. As illustratively shown in FIG. 2, control and monitoring system 102 includes a communication system 240, a data store 242, one or more processors and/or servers 238, aggregation logic 244, load tracking logic 246, data mining logic 248, output generator logic 250, comparison logic 252, user interaction system 264 and other logic 254. Control and monitoring system 102 can receive a multitude of material tracking indicators from mobile machine 106 over network 256 through communication system 240. Upon receiving material tracking indicators from mobile machine 106, the material tracking indicators can be stored in data store 242 and indexed based on a time interval, worksite operation, mobile machine, operator, etc. Material tracking indicators can also be stored at remote system 112. Additionally, control and monitoring system 102 can receive material tracking indicators from other mobile machines located at the same or different worksites.

Aggregation logic 244 is configured to combine material tracking indicators from a plurality of mobile machines and generate an aggregate indication of moved material by the mobile machines to different positions in a worksite. Aggregation logic 244 can combine material tracking indicators from mobile machines either intermittently or continuously throughout a worksite operation. Load tracking logic 246 receives a multitude of material tracking indicators from a plurality of mobile machines on a worksite and tracks a movement of the material amongst the plurality of mobile machines. For example, mobile machine 106 may include an excavator that transports material to an articulated dump truck for transport to a dump site within a worksite. Load tracking logic 246 receives material tracking indicators from the excavator and articulated dump truck and tracks a movement of the material within the worksite, as well as the movement performed by each machine.

In one example, material tracking indicators are received from mobile machine 106 (and possibly other machines) and indexed within data store 242. A user of control and monitoring system 102 can provide a query through user interaction system 264 and be provided with an output. User interaction system 264 can include a point and click device, hardware buttons, switches, joystick or keyboard, thumb switches or thumb pads, touch screen displays, etc. Based on the user query, data mining logic 248 can mine data store 242 for relevant information pertaining to the user query, and output generator logic 250 can provide an output to the user of the control and monitoring system 102. Thus, one can search for the amount of material moved by a machine, an operator, a group of machines, the location or track of movement, etc.

Additionally, control and monitoring system 102 can include comparison logic 252 which can compare material tracking indicators over a duration of time to a worksite goal, or, can compare a performance of operators on different mobile machines. For example, a user of control and monitoring system 102 can be provided with an aggregate indication of material moved throughout a worksite operation or can track individual loads of material transported throughout a worksite operation. Additionally, the user can be provided with indications of dig and dump operations or when a load of material is entering or exiting a worksite operation. An output of control and monitoring system 102 can be provided to a user over a display device in user interaction system 264 as well as to operators of mobile machines, and others.

Figure 3:
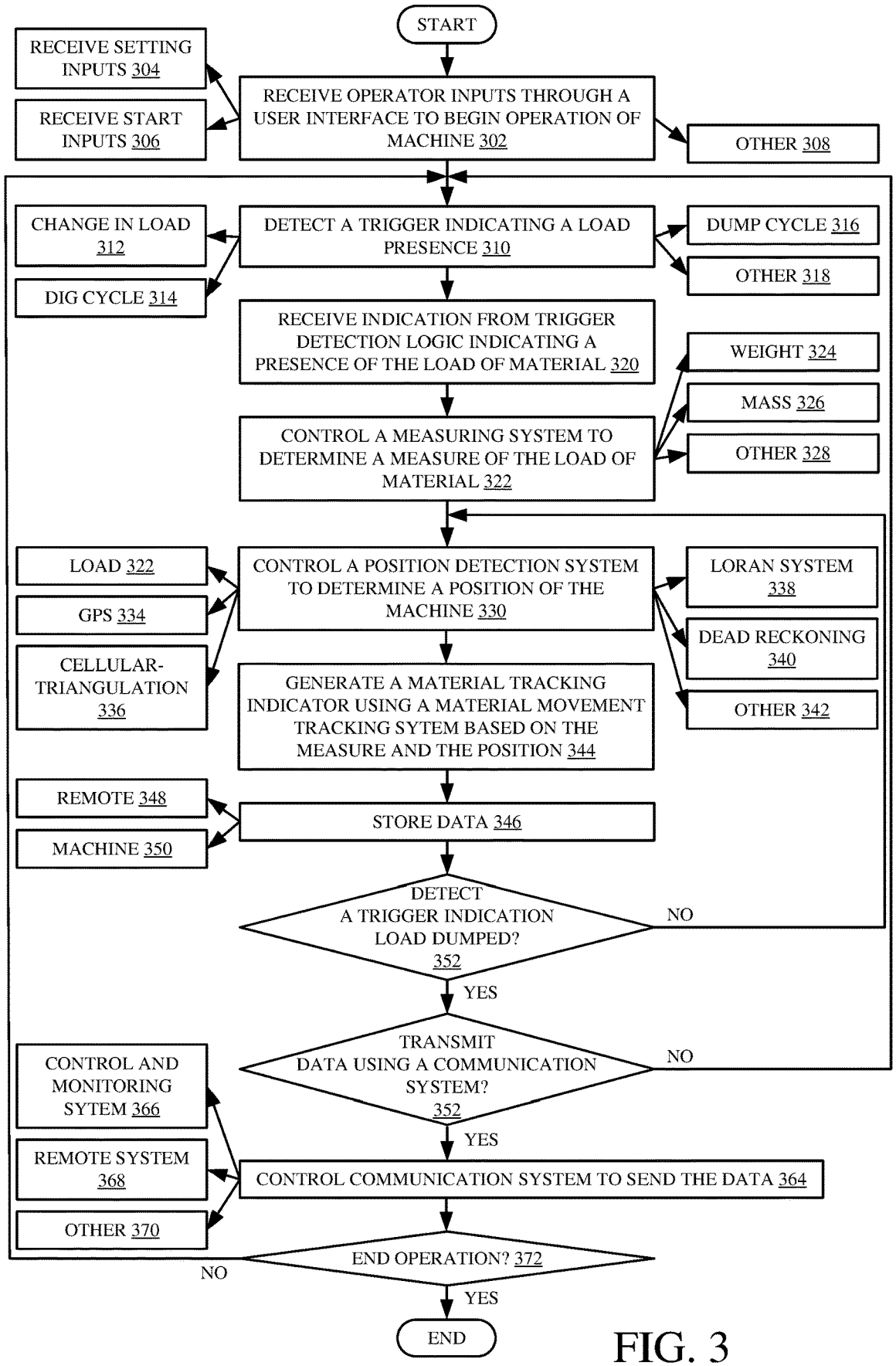
FIG. 3 is a flow diagram showing one example of an operation of a material movement tracking system illustrated in FIG. 2.

FIG. 3 is a flow diagram showing one example of an operation of a material movement tracking system illustrated in FIG. 2. The operation shown in FIG. 3 is one example of generating a material tracking indicator which can be used to control, monitor and manage a machine and/or a worksite operation. While it is discussed in the context of gathering data related to a measure of a load of material and a position of a mobile machine, additional or different data can also be gathered as well. Additionally, it is to be understood that an operation of the material movement tracking system can be carried out at any time or at any point throughout a worksite operation, or if a worksite operation is not currently underway. Further, while the operation will be described in accordance with mobile machine 106, it is to be understood that any or all mobile machines 106, 108, 110, or 232 or others can be used.

Machine 106 first receives operator inputs to begin operation of the machine. This is indicated in block 302. This can be done in a variety of ways. For instance, the operator can provide initial machine settings based on a worksite operation. The operator can input these settings based upon his or her own prior experience and knowledge. The settings can be made manually, such as through mechanical or other user input mechanisms, or they can be made automatically by the machine itself, or they can be input in a different way, such as through a touch screen or other user input mechanism. Receiving initial operating settings is indicated by block 304. The operator can provide a start input indicating that the operator wishes to start operation of machine 106. This is indicated by block 306. The operator can of course provide other inputs as well, and this is indicated by block 308. For example, an operator may specify a frequency that material movement tracking system 214 is to generate material tracking indicators during operation of mobile machine 106, among other things.

During operation of machine 106, trigger detection logic 216 is configured to detect a presence of a load of material within load carrying mechanism 208. This is indicated by block 310. In one example, trigger detection logic 216 can detect a presence of a load of material based on a detected change in measure from measuring system 204, as indicated in block 312. However, trigger detection logic 216 can detect a presence of a load of material in other ways as well, as indicated by block 318. This can include receiving signals from sensors 262 which may include optical sensors, weight sensors, etc.

Based on a detected presence of a load of material, a dig cycle can be determined within a worksite operation. For example, if there is a sudden increase in measure detected by measuring system 204, this may indicate that machine 106 just performed a dig operation or that a load was dumped into it. For example, mobile machine 106 may include an excavator that has obtained material from a stockpile within the worksite (so a dig operation is detected). Also, mobile machine 106 may include an articulated dump truck that has obtained material from an excavator within the worksite. In these and other scenarios, an indication of a dig cycle, or load cycle as in the case of the dump truck, can be provided as indicated by block 314. Also, a dump cycle within a worksite operation can also be determined. For example, if there is a sudden decrease in measure detected by measuring system 204, this indicates that a load of material has left mobile machine 106. For example, a load of material can be transported and dumped at a dumpsite, by a dump truck, within the worksite. Additionally, the load of material can be transported to another mobile machine within the worksite such as when an excavator or wheel loader fills a dump truck. In these and other scenarios, an indication of a dump cycle can be provided as indicated by block 316.

When trigger detection logic 216 detects a presence of a load of material within load carrying mechanism 208, an indication can be provided to other components of mobile machine 106 as indicated by block 320. In one example, this includes measuring system 204. Upon receiving the indication, measuring system 204 determines a measure of the load of material within load carrying mechanism 208 of mobile machine 106, as indicated by block 322. Determining a measure can include determining a weight of the load of material as indicated by block 324. In another example, it can include determining a mass of the load of material as indicated by block 326. However, it is contemplated that a measure can include other properties (such as volume, material type, etc.) of a load of material as indicated by block 328. In one example, to generate the measure, measuring system 204 can receive sensor signals from sensors 262 on mobile machine 106, which can include strain gauges, optical sensors, ultrasound sensors, pressure sensors that sense pressure in hydraulic actuators used to support the load, scales, among others. Measuring system 208 can determine a measure using other means as well.

In one example, position detection system 202 also receives an indication of a presence of a load of material on mobile machine 106, as indicated in block 330. Upon receiving an indication, position detection system 202 can determine a position of mobile machine 106. Additionally, an exact position of a load of material can also be determined as indicated in block 332. A position of mobile machine 106 can be determined using a global position system (GPS) as indicated by block 334. Alternatively, position detection system 202 can include cellular-triangulation, as indicated by block 336, a LORAN system, as indicated by block 338, or a dead reckoning system as indicated by block 340. Other position systems are also contemplated herein, as indicated by block 342.

To determine the position of the load of material, as opposed to determining just the position of mobile machine 106, a variety of techniques can be used. For example, based on known machine dimensions and cylinder positions, the spatial relationships between a GPS receiver and load carrying mechanism 208 can be obtained to generate an exact geospatial position of a load of material. Additionally, a receiver can be placed at a position located adjacent to load carrying mechanism 208 to determine a position of the load of material. However, a variety of other techniques can be used as well.

After determining a measure of a load of material and a position of mobile machine 106, or of the load of material itself, or both, a material tracking indicator is generated as indicated in block 344. In one example, material movement tracking system 214 can receive a measure from measuring system 204 and a position from position detection system 202 and generate a material tracking indicator. The material tracking indicator can indicate an amount of material at a position within a worksite. The material tracking indicator can indicate a composition of material based on the determined measure or based on other inputs. In one example, the material tracking indicator allows a manager of a worksite to oversee a transport of material around the worksite. Additionally, the manager can also be provided with a notification of dig/dump cycles in a given worksite operation. Also, while the present operation is described with respect to generating a material tracking indicator in response to a received trigger indication from trigger detection logic 216, it is expressly contemplated that material tracking indicators can be generated at predetermined time intervals without first receiving an indication from trigger detection logic 216. Additionally, material tracking indicators can also be generated continuously throughout a worksite operation, or in other ways.

Once the load presence is detected, and the load is measured and its position is detected, then updated position indicators are generated until the load is removed (e.g., dumped) from the machine 106. Therefore, in one example, the generated material tracking indicator can be stored within a data store 260 of mobile machine 106, as indicated by block 350. However, the generated material tracking indicator can be stored remotely from mobile machine 106 as indicated by block 348.

If, at block 352, a dump trigger is not yet detected, then processing proceeds back to block 330 where position detection system 202 continues to determine additional positions of mobile machine 106, or positions of the load of material, or both, as machine 106 moves around. These values are stored, as indicated by block 330-350.

If, at block 352, it is determined that a trigger input is received indicating a dump cycle, (that the load has been removed from the machine 106) then a determination is made as to whether the generated material tracking indicators should be transmitted to another system using communication system 210 of mobile machine 106, as indicated by block 354. For example, material tracking indicators can be transmitted to remote system 112 and/or control and monitoring system 102. Material tracking indicators can be transmitted intermittently as indicated by block 356. However, material tracking indicators can be transmitted continuously, as indicated by block 358, based upon a completed work cycle, as indicated by block 360, or at any other desired moment, or based on any other criteria, as indicated by block 362.

If it is determined that material tracking indicators should not be transmitted, processing proceeds back to block 310 where the system waits for trigger detection logic 216 to detect another trigger, such as a presence of a load of material. Alternatively, if the material tracking indicators should be transmitted, the processing proceeds to block 364 where communication system 210 of mobile machine 106 sends the material tracking indicators to control and monitoring system, as indicated by block 366, and/or remote system 112, as indicated by block 386. However, material tracking indicators can be sent to other components or systems as indicated by block 370. As long as the operator continues to operate mobile machine 106, processing reverts back to block 310 where a presence of a load of material is determined. At some point, the operator will terminate operation of mobile machine 106. This is indicated by block 372.

Figure 4:
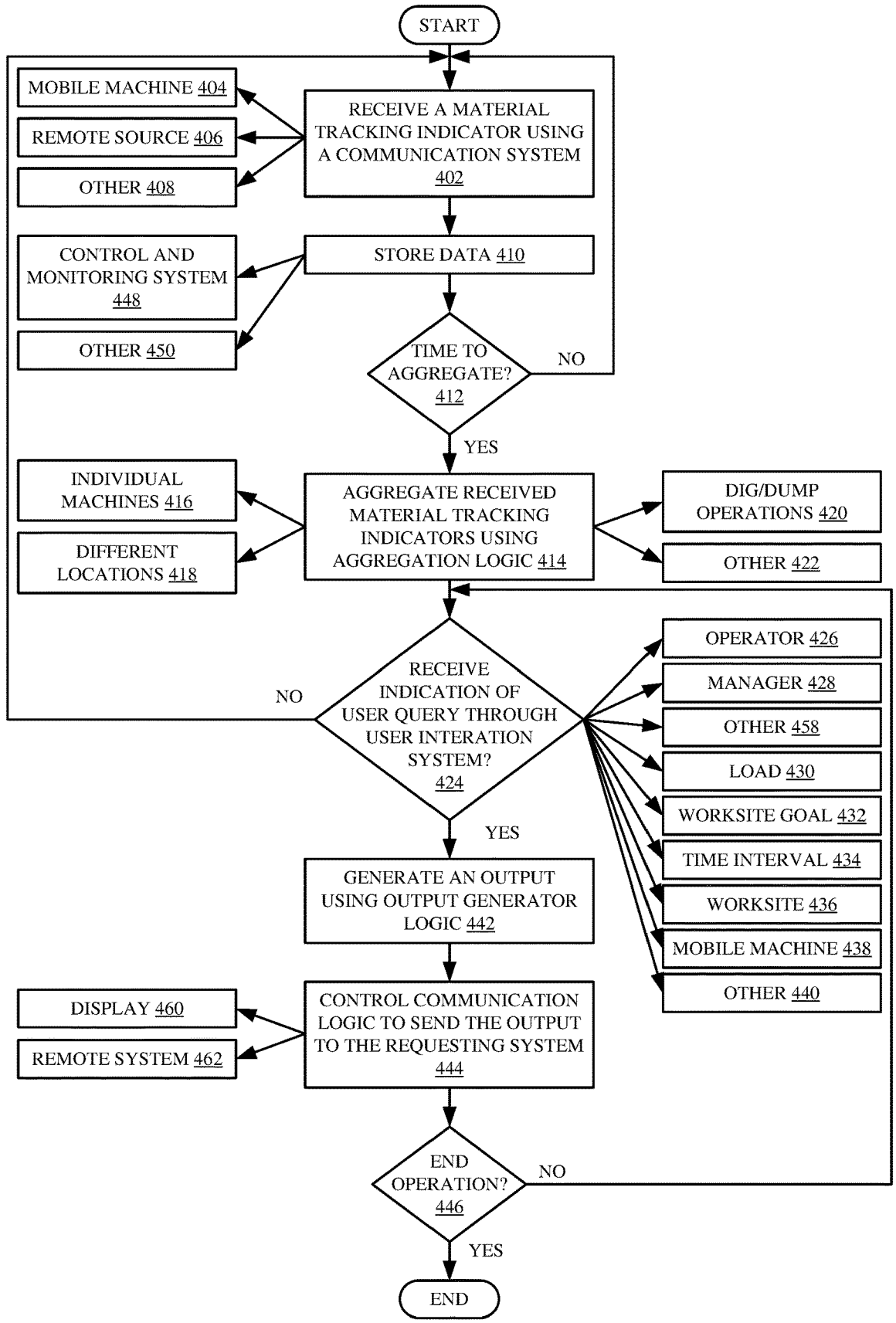
FIG. 4 is a flow diagram showing one example of an operation of a control and monitoring system illustrated in FIG. 2.

FIG. 4 is a flow diagram showing one example of an operation of a control and monitoring system illustrated in FIG. 2. The operation shown in FIG. 4 is one example of generating an output using control and monitoring system 102 based on a received user query. While it is discussed in the context of gathering material tracking indicators from one or more mobile machines, additional or different data can also be gathered as well. Additionally, an operation of control and monitoring system 102 can be carried out at any time or at any point during a worksite operation.

Control and monitoring system 102 first receives a material tracking indicator as indicated in block 402. This can include receiving a material tracking indicator from one or more mobile machines, for example, mobile machines 106, 108, 110 and 232, or any other mobile machines as indicated by block 404. This can also include receiving a material tracking indicator from remote source 112, as indicated by block 406. Control and monitoring system 102 can also receive a material tracking indicator from any other source as indicated by block 408.

A material tracking indicator is then stored as indicated by block 410. In one example, the material tracking indicator is stored within data store 242 of control and monitoring system 102, as indicated by block 448. However, the material tracking indicator can be stored at any other location, as indicated by block 450. The material tracking indicator can also be indexed within data store 242 or another storage location based on time, mobile machine, operator, worksite operation, etc. Additionally, while it is illustratively shown that the material tracking indicator is stored after receiving the indication, it is to be understood that the material tracking indicator can be stored at any time either continuously or intermittently.

At block 412, a determination is made whether the material tracking indicators should be aggregated. In one example, control and monitoring system 102 can aggregate the material tracking indicators intermittently, as indicated by block 454, continuously, as indicated by block 452, or at any point during or after a worksite operation as indicated by block 456. Additionally, it is contemplated that a time in which the material tracking indicators are aggregated can vary based on a received user input. For example, a manager of a worksite operation can provide an indication, using user interaction system 264, indicating that the material tracking indicators are to be aggregated every time an indication of a dump cycle is received, or at specific time intervals during a worksite operation, etc. If it is determined that material tracking indicators are to be aggregated, processing proceeds to block 414 where the material tracking indicators are aggregated. However, if it is determined that the material tracking indicators should not be aggregated, processing reverts to block 402 where material tracking indicators continue to be received.

Material tracking indicators can be aggregated based on any defined or desired criteria. For example, material tracking indicators can be aggregated based on the mobile machine that transmitted the material tracking indicators as indicated by block 416. The material tracking indicators can also be aggregated based on a location of a load of material as indicated by block 418, or based on a dig and/or a dump operation as indicated by block 420. However, material tracking indicators can be aggregated based on any other criteria, as indicated by block 422, such as an operator of the mobile machine, for example, or a time period, e.g. a shift, in which material tracking indicators are received, among others.

At block 424, a determination is made as to whether a user query is detected through user interaction system 264. However, it is contemplated that a user query can be received in other ways as well. Additionally, while it is illustratively shown that a user query is received after material tracking indicators are aggregated, it is contemplated that a user query can be received, and an output subsequently provided, at any point. Additionally, a user query can be received from an operator of a mobile machine, as indicated by block 426, a worksite manager, as indicated by block 428, or any other personnel as indicated by block 458.

In one example, a user query can include a query to receive tracking results that track a load of material around a worksite as indicated by block 430. For example, a manager of a worksite may want to know where a load of material was transported to in a worksite and what mobile machine(s) were involved. Additionally, a user query can request a comparison of a current performance to a worksite goal. For example, based on a determined amount of material moved in a worksite, a determination can be made as to whether a worksite goal is on schedule to be completed during a designated time period. In one example, a report can be generated and/or a display rendered of the comparison. A user query can also include a query to track a movement of material across a time interval as indicated by block 434. For example, a user of control and monitoring system 102 may want to know how much material was moved in an afternoon, during a shift, or between the hours of 1:00 pm-2:00 pm, for example.

In one example, a user query can request a total amount of material moved by all of the mobile machines located at a worksite. For example, control and monitoring system 102 can track all of the material moved, and can provide an output indicative of a total amount of material moved by the mobile machines. Additionally, besides tracking a total amount of material moved, control and monitoring system 102 can track an amount of material moved by an individual mobile machine within a worksite. For example, by receiving material tracking indicators from one or more mobile machines, e.g. mobile machines 106, 108, 110 or 232, control and monitoring system 102 can track a position and measure of loads of material as they move around a worksite in one or more machines. A variety of data can be generated based on the received material tracking indicators, and while some examples are provided herein, other data can be generated as well as indicated by block 440.

Upon receiving a user query, an output is generated by control and monitoring system 102 as indicated by block 442. The output is then communicated to the requesting system as indicated by block 444. In one example, this can include displaying the output on a display of either control and monitoring system 102 or mobile machine 106, as indicated by block 460. Additionally, the output can be provided to remote systems 112 as well, as indicated by block 462.

A determination is made in block 446 whether an operation of control and monitoring system 102 should continue. For example, if a user has another query for control and monitoring system 102, processing proceeds back to block 424 where another user query is received. However, if it is determined that an operation should conclude, processing ends.

Figure 5:
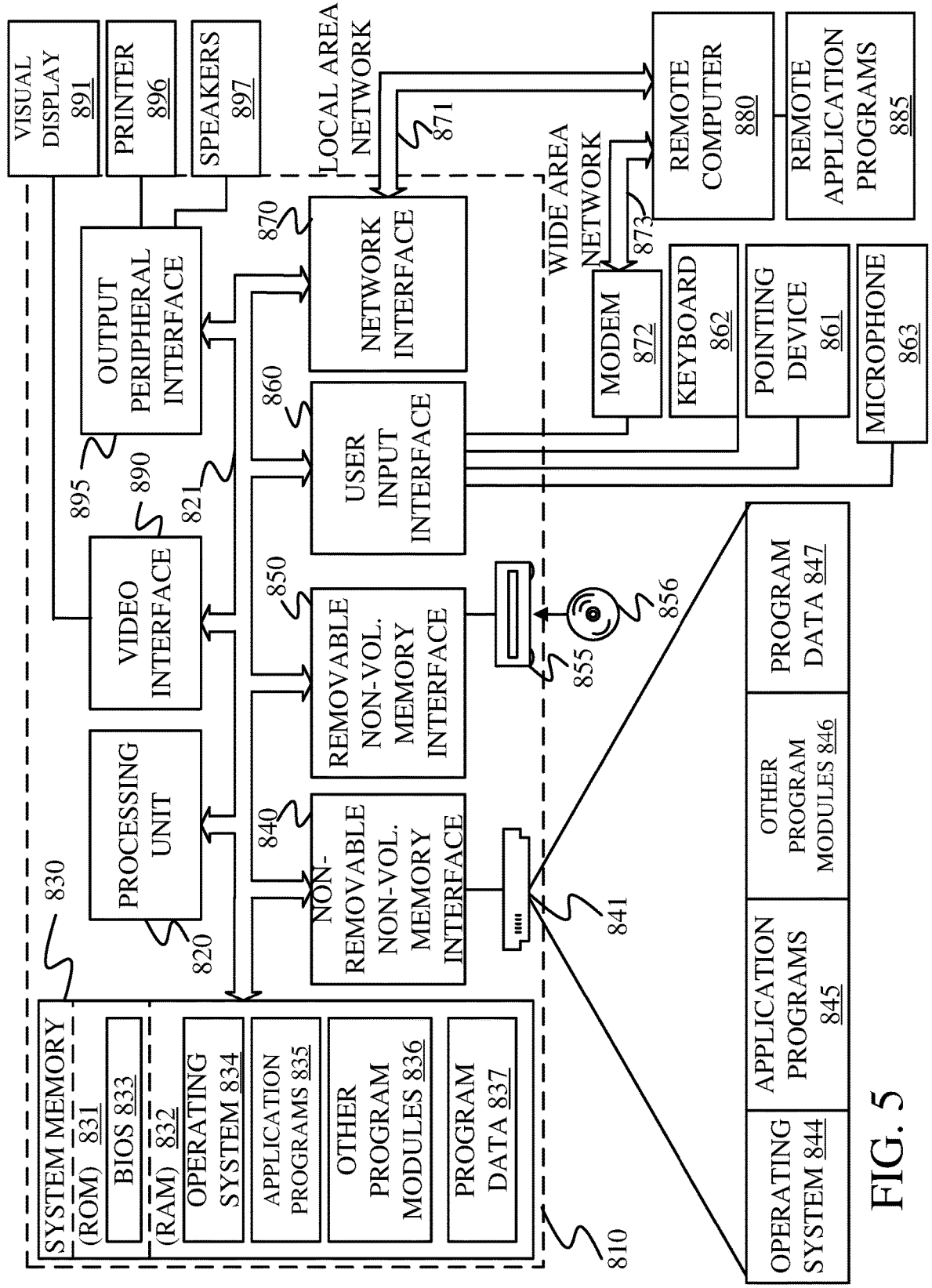
FIG. 5 is a block diagram of one example of a computing environment that can be used in the architectures shown in the previous figures.

FIG. 5 is one example of a computing environment in which elements of FIG. 2, or parts of it, (for example) can be deployed. With reference to FIG. 5, an example system for implementing some embodiments includes a general-purpose computing device in the form of a computer 810. Components of computer 810 may include, but are not limited to, a processing unit 820 (which can comprise processors or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 2 can be deployed in corresponding portions of FIG. 5.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 5 illustrates operating system 834, application programs 835, other program modules 836, and program data 837.

The computer 810 may also include other removable/non-removable volatile/nonvolatile computer storage media. By way of example only, FIG. 5 illustrates a hard disk drive 841 that reads from or writes to non-removable, nonvolatile magnetic media, and an optical disk drive 855, and non-volatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 5, provide storage of computer readable instructions, data structures, program modules and other data for the computer 810. In FIG. 5, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 5 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Example 1 is a mobile machine, comprising:
a load moving mechanism configured to move a load of material during operation of the mobile machine at a worksite;
a position detection system configured to determine a position of the mobile machine and generate a position output indicative of the position of the mobile machine;
a measuring system configured to determine a measure of the load and generate a measure output indicative of the measure of the load; and
a material movement tracking system configured to receive the position output from the position detection system and the measure output from the measuring system, and, based on both the position and the measure output, generate a material tracking indicator indicative of movement of the load of material around the worksite.

Example 2 is the mobile machine of any or all previous examples further comprising a communication system configured to communicate the material tracking indicator to a remote control and monitoring system.

Example 3 is the mobile machine of any or all previous examples wherein the remote control and monitoring system comprises load tracking logic configured to receive a plurality of material tracking indicators from a plurality of mobile machines on the worksite and to track movement of the load of material among the plurality of mobile machines.

Example 4 is the mobile machine of any or all previous examples further comprising a user interface device configured to provide a display of the material tracking indicator to an operator of the mobile machine.

Example 5 is the mobile machine of any or all previous examples wherein the material movement tracking system comprises:
trigger detection logic that detects a presence of the load relative to the load moving mechanism on the mobile machine, and, based on the detected presence, provides an indication of the detected load presence to the position detection system and the measuring system.

Example 6 is the mobile machine of any or all previous examples wherein the trigger detection system is configured to detect a change in measure, indicated by the measure output, that indicates the load is engaged with, or disengaged from, the load moving mechanism.

Example 7 is the mobile machine of any or all previous examples wherein the material movement tracking system further comprises:
load tracking logic configured to track movement of the load as the mobile machine moves in the worksite.

Example 8 is the mobile machine of any or all previous examples wherein the material movement tracking system further comprises:
aggregation logic configured to aggregate a measure of a plurality of different loads of the material moved by the mobile machine based on the measure output and the position output and generate an aggregate material tracking indicator indicative of movement of the aggregate measure of the material.

Example 9 is the mobile machine of any or all previous examples wherein the aggregation logic is configured to aggregate the measure of the plurality of different loads of the material and generate the aggregate material tracking indicator intermittently.

Example 10 is the mobile machine of any or all previous examples wherein the load moving mechanism comprises a digging mechanism that executes dig and dump operations.

Example 11 is the mobile machine of any or all previous examples wherein the trigger detection logic detects a dig operation based on changes in the measure output.

Example 12 is the mobile machine of any or all previous examples wherein the trigger detection logic detects a dump operation based on changes in the measure output.

Example 13 is the mobile machine of any or all previous examples wherein the measure output is indicative of a composition of the load of material within the load moving mechanism.

Example 14 is the mobile machine of any or all previous examples wherein the load tracking logic provides an indication that the mobile machine, and the load of material, exited the worksite.

Example 15 is a control and monitoring system for a worksite, comprising:
a communication system configured to receive a plurality of material tracking indicators from a mobile machine at the worksite, the material tracking indicators being indicative of movement of a load of material, by the corresponding mobile machine, within the worksite, and an amount of material in the load;
aggregation logic configured to combine the plurality of material tracking indicators to obtain an aggregate indication indicative of movement of an aggregate amount of material, by the mobile machine, to different positions in the worksite; and
output generator logic configured to receive a query from a user and generate an output based on the aggregate indication generated from the aggregation logic.

Example 16 is the control and monitoring system of any or all previous examples further comprising:
comparison logic configured to compare the aggregate indication to a worksite objective, and, based on the comparison, generate an output indicative of whether the worksite objective is being met.

Example 17 is the control and monitoring system of any or all previous examples wherein the query from the user comprises an aggregate indication over a specified timeframe at the worksite.

Example 18 is method of operating a mobile machine in a worksite, comprising:
engaging a load of material during a worksite operation using a load moving mechanism of the mobile machine;

controlling a position detection system to determine a position of the load of material and generate a first signal indicative of the position;

controlling a mass detection system to determine a mass of the load of material and generate a second signal indicative of the mass; and controlling a material movement tracking system to receive the first and the second signals and generate a material tracking indication based on the received first and second signals, the material tracking indication being indicative of movement of the load of material in the worksite.

Example 19 is the method of any or all previous examples further comprising:

communicating the material tracking indication, using a communication system of the mobile machine, to a remote control and monitoring system.

Example 20 is the method of any or all previous examples further comprising:

displaying the material tracking indication on a display of the mobile machine to an operator of the mobile machine.

What is claimed is:

1. A mobile machine, comprising:
a position detection system configured to determine a position of the mobile machine and generate a position output indicative of the position of the mobile machine;
a measuring system configured to determine a measure of a load of material moved by the mobile machine during operation of the mobile machine at the worksite and generate a measure output indicative of the measure of the load; and
a material movement tracking system configured to receive the position output from the position detection system and the measure output from the measuring system, and, based on both the position and the measure output, generate a material tracking indicator indicative of movement of the load of material around the worksite.

2. The mobile machine of claim 1, further comprising:
a communication system configured to communicate the material tracking indicator to a remote control and monitoring system.

3. The mobile machine of claim 2, wherein the remote control and monitoring system comprises load tracking logic configured to receive a plurality of material tracking indicators from a plurality of mobile machines on the worksite and to track movement of the load of material among the plurality of mobile machines.

4. The mobile machine of claim 1, further comprising:
a user interface device configured to provide a display of the material tracking indicator to an operator of the mobile machine.

5. The mobile machine of claim 1, wherein the material movement tracking system comprises:
trigger detection logic that detects a presence of the load relative to the mobile machine, and, based on the detected presence, provides an indication of the detected load presence to the position detection system and the measuring system.

6. The mobile machine of claim 5, wherein the trigger detection system is configured to detect a change in measure, indicated by the measure output, that indicates the load is engaged with, or disengaged from, the mobile machine.

7. The mobile machine of claim 5, wherein the material movement tracking system further comprises:
load tracking logic configured to track movement of the load as the mobile machine moves in the worksite.

8. The mobile machine of claim 7, wherein the material movement tracking system further comprises:
aggregation logic configured to aggregate a measure of a plurality of different loads of the material moved by the mobile machine based on the measure output and the position output and generate an aggregate material tracking indicator indicative of movement of the aggregate measure of the material.

9. The mobile machine of claim 8, wherein the aggregation logic is configured to aggregate the measure of the plurality of different loads of the material and generate the aggregate material tracking indicator intermittently.

10. The mobile machine of claim 5, wherein the mobile machine includes a digging mechanism that executes dig and dump operations.

11. The mobile machine of claim 10, wherein the trigger detection logic detects a dig operation based on changes in the measure output.

12. The mobile machine of claim 10, wherein the trigger detection logic detects a dump operation based on changes in the measure output.

13. The mobile machine of claim 1, wherein the measure output is indicative of a composition of the load of material.

14. The mobile machine of claim 7, wherein the load tracking logic provides an indication that the mobile machine, and the load of material, exited the worksite.

15. A control and monitoring system for a worksite, comprising:
a communication system configured to receive a plurality of material tracking indicators from a mobile machine at the worksite, the material tracking indicators being indicative of movement of a load of material, by the corresponding mobile machine, within the worksite, and an amount of material in the load;
aggregation logic configured to combine the plurality of material tracking indicators to obtain an aggregate indication indicative of movement of an aggregate amount of material, by the mobile machine, to different positions in the worksite; and
output generator logic configured to receive a query from a user and generate an output based on the aggregate indication generated from the aggregation logic.

16. The control and monitoring system of claim 15, further comprising:
comparison logic configured to compare the aggregate indication to a worksite objective, and, based on the comparison, generate an output indicative of whether the worksite objective is being met.

17. The control and monitoring system of claim 15, wherein the query from the user comprises an aggregate indication over a specified timeframe at the worksite.

18. A method of operating a mobile machine in a worksite, comprising:
controlling the mobile machine to engage a load of material during a worksite operation using a load moving mechanism;
controlling a position detection system to determine a position of the load of material and generate a first signal indicative of the position;
controlling a mass detection system to determine a mass of the load of material and generate a second signal indicative of the mass; and
controlling a material movement tracking system to receive the first and the second signals and generate a material tracking indication based on the received first and second signals, the material tracking indication being indicative of movement of the load of material in the worksite.

19. The method of claim 18, further comprising:
communicating the material tracking indication, using a communication system of the mobile machine, to a remote control and monitoring system.

20. The method of claim 18, further comprising:
displaying the material tracking indication on a display of the mobile machine to an operator of the mobile machine.

\* \* \* \* \*